July 16, 1940.     P. THOMAS     2,208,402
AUTOMATIC PARALLELING RELAY
Filed April 29, 1939

WITNESSES:
Edward Michaels
William J. Ruano

INVENTOR
Phillips Thomas.
BY
Paul E. Friedemann
ATTORNEY

Patented July 16, 1940

2,208,402

UNITED STATES PATENT OFFICE 2,208,402

AUTOMATIC PARALLELING RELAY

Phillips Thomas, Edgewood, Pa., assignor to Westinghouse Electric & Manufacturing Company, East Pittsburgh, Pa., a corporation of Pennsylvania Application April 29, 1939, Serial No. 270,869

9 Claims. (Cl. 171—118)

My invention relates to an automatic paralleling relay for use in adding a synchronous generating unit to an alternating current system.

In order to cause the least disturbance to an alternating current system, due to adding a synchronous generating unit, the tie circuit should be closed at the instant of exact phase equality. If the units are too large to be connected by a manually operated switch, the initiation of the closure of the tying breaker must be made at a time prior to phase agreement, and the time interval should be directly proportional to the frequency difference between the system voltage and that of the incoming machine. In the past, electrical means have been generally used to secure this automatic advance.

An object of my invention is to provide a mechanical means for effecting automatic closure of a paralleling relay circuit at a time prior to that of exact phase equality, such advanced time interval being always proportional to the frequency difference between the system voltage and that of the incoming machine.

A more specific object of my invention is to provide a gyroscope, the angular rotation of its precession movement of which is proportional to the frequency difference between the system voltage and that of the incoming machine, hence the gyroscope may be used to secure automatic advanced closing of a paralleling relay circuit and at the same time set an upper limit of beat frequency above which paralleling is impossible.

Figure 1:
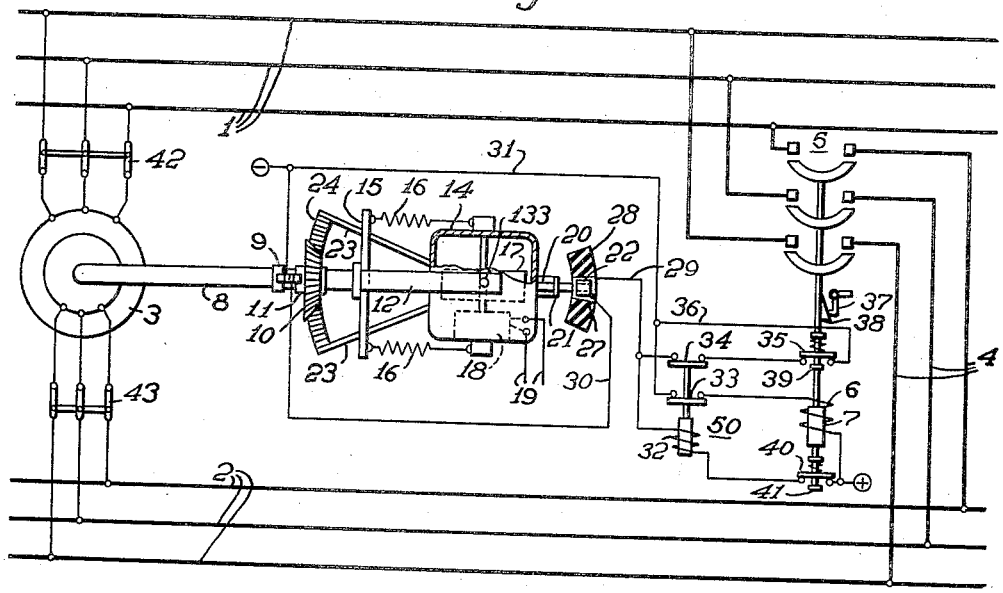
Figure 2:
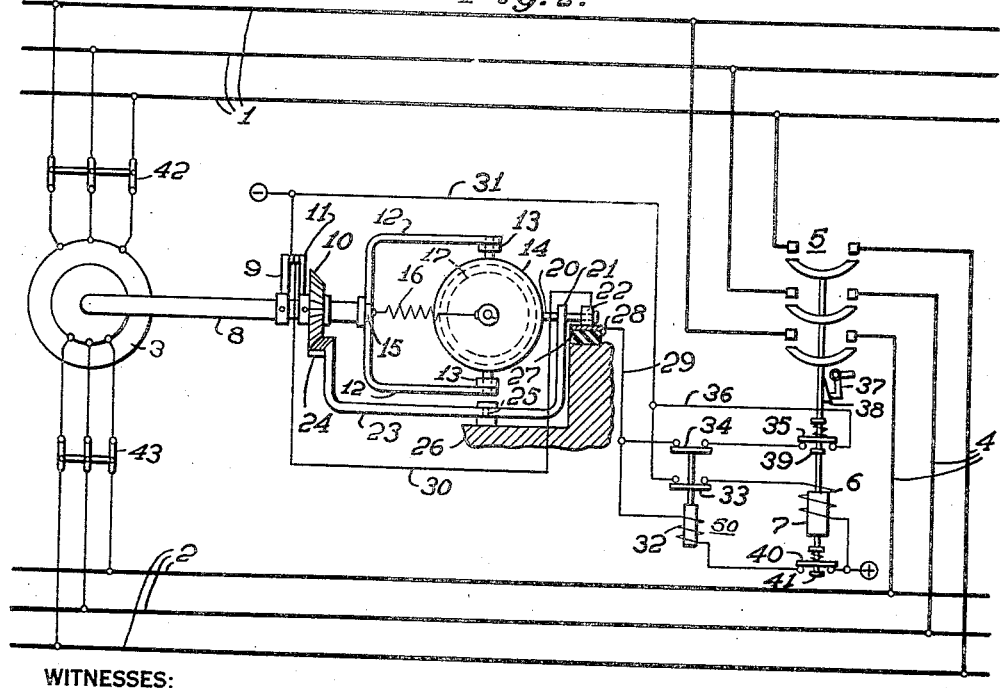

Other objects and advantages will become more apparent from a study of the following specification when considered in conjunction with the accompanying drawing, in which:

Figure 1 is a top view schematically showing a system embodying my invention; and Fig. 2 is a front view of the system illustrated in Fig. 1.

Referring to Figs. 1 and 2, numeral 1 denotes buses of an alternating current generating system and numeral 2 denotes the buses of a synchronous, alternating current generating unit. A small alternating current reversible motor 3 has stator and rotor windings which are respectively energized by buses 1 and 2. Thus it will be seen that motor 3 will be run at a speed which is proportional to the frequency difference of the voltages generated in buses 1 and 2. When the frequency difference becomes zero, motor 3 comes to a standstill. If the frequency of the voltage impressed on buses 1 is greater than that of the voltage on buses 2, the motor will rotate in one direction whereas if it is less than that on buses 2, the motor will rotate in an opposite direction. Tie circuit 4 includes a main circuit breaker 5, which circuit breaker is actuable into its closed position by the energization of actuating coil 6 which effects upward movement of the plunger 7, resulting in closure of the contact members of the main circuit breaker 5.

The drive shaft 8 of the motor 3 has keyed thereto a rotating contact member 9. Drive shaft 8 extends through a beveled gear 10 which is loosely mounted on the drive shaft and which has rigidly secured thereto contact member 11. Secured to the end of drive shaft 8 is a gyroscope mounted on trunnions 13 journalled in a pair of forked arms 12. Also rigidly secured to drive shaft 8 at right angles to the forked arms 12 is an arm 15. Between each of the ends of arm 15 and the portion of the casing 14 is a spring 16. Rotatably mounted within the casing 14 is a rotor 17, which rotor is actuated by means of a conventional constant speed gyro electric motor 18 which is energized by a suitable source 19. Rigidly secured to casing 14 is a shaft 20, which shaft is adapted to rotate within two different bearing members 21 and 22. Bearing member 21 is formed in the portion of a forked arm 23 to which is secured an arcuate gear 24. Arm 23 is pivoted by a pin 25 which projects from a stationary frame 26. The other bearing member 22 is in the form of a square nut having bored therethrough a cylindrical hole which fits the shaft 20. The bearing member 22 is, in effect, a contact member which is slidable on a corresponding contact member 27 which is seated in the mid portion of an insulating arcuate member 28, which member 28 is fixed to the stationary frame 26.

The operation of the device is as follows: Assume that voltages of buses 1 and 2 have acquired exact phase equality. Drive shaft 8 of motor 3 then will come to rest since the frequency difference of the two systems is zero. The parts more directly controlled by the gyroscope will then assume a position such as shown in Figs. 1 and 2. The energizing circuit for the paralleling relay will have been closed, which circuit may be traced from the terminal marked (+), through the bridged contact members 49 to actuating coil 32 of a high speed relay 50, conductor 29, contact member 27, the bearing or contact member 22, conductor 30, the contact member 11 and the contact member 9 to terminal marked (—).

Any suitable energizing source, for example, an alternating current source could also be used to energize the paralleling circuit. Energizing of actuating coil 32 will effect a quick operation of its contact members resulting in a rapid closure of contact members 33 and 34. Thus another circuit will be completed from the positive terminal through bridged contact members 40 to actuating coil 32, the bridged contact members 34 and 35, conductors 36 and 31 to the negative terminal.

Thus, contact members 33 and 34 will remain sealed in their closed position by virtue of the above circuit as long as the spring pressed bridging member of contact members 35 and 40 remain in the bridging or closed position. Hence even though the relay circuit should be interrupted by opening of contact members 9—11 or of contact members 22—27 the above described circuit nevertheless maintains contact members 33 and 34 in their closed position. In the meanwhile, still another circuit is completed which may be traced from the positive terminal to actuating coil 6 of the main circuit breaker 5, contact members 33, conductor 31 to the negative terminal. Thus, actuating coil 6 is energized effecting a relatively slow upward movement (due to inertia of the parts of circuit breaker 5) of the plunger 7, which upward movement, initially, has no effect on the closed contact members 35 and 40 due to the energy stored in the compressed spring which acts on the bridging element of contact members 35 and 40. One end of the spring is secured to the rod of plunger 7 while the other end is secured to the bridging contact element. However as soon as the main circuit breaker contact members 5 have closed, so as to complete the tie circuit 4 and as soon as the latching element 37 has dropped by gravity (or otherwise, such as by a spring) beneath the projection 38, the plunger 7 will have moved upwardly sufficiently to cause the bridging element to separate from the other contact members of contact members 35 and 40. This separation is further insured by means of collars 39 and 41, respectively, which actually abut the bridging elements after the plunger 7 has moved upwardly a predetermined amount. Opening of contact members 35 and 40 will interrupt the circuit through actuating coil 32 thereby deenergizing the same and allowing the plunger associated therewith to drop by gravity and effect opening of contact members 33 and 34. In order to start the entire paralleling operation anew the latching element 37 is moved so as to unlatch projection 38 and allow plunger 7 to drop by gravity, thus opening the contact members of the main circuit breaker 5.

The effect of closure of the main circuit breaker 5, of course, is to complete tie circuit 4 and parallel the incoming machine represented by buses 2 to the alternating system represented by buses 1. It will be seen that there is inherently a delay between the time that the relay circuit is closed and the time in which the contact members of circuit breaker 5 are closed due to the inertia of the plunger 7 and its associated parts. Hence it becomes necessary to close the relaying circuit at a time prior to that in which it is desired that the circuit breaker 5 will close. It will further appear as the voltages of buses 1 and 2 are approaching phase equality, the greater the difference in their frequencies, the longer the time interval will be required between the closing of the relay circuit and the closing of the main circuit breaker 5. An automatic control for closing the relay circuit at a time interval in advance of phase equality and which is proportional to the frequency difference of the two voltages is effected by the precession movement of the gyroscope. After the main circuit breaker 5 has been closed and paralleling has been effected, switches 42 and 43 may be manually opened to disconnect the motor 3 from the system. It is contemplated, of course, that the switches 42 and 43 may be opened automatically instead of in response to the opening of circuit breaker 5.

Referring more particularly to the action of the gyroscope, it will be seen that through fork arms 12, the entire gyroscope is rotated in unison with the drive shaft 8. Casing 14, which is pivoted to the forked arms 12 is not only rotated in unison with drive shaft 8, but has an additional movement, which movement is about a pivot in the trunnions 13. This latter movement is normally restrained by the springs 16, which tend to keep casing 14 in a normal intermediate position such as shown in the drawing. In the meanwhile, of course, gyro motor 18 drives the rotor 17 within the casing 14 at a constant speed.

Assume now that the voltage frequencies in buses 1 and 2 are different, motor 3 will thus drive the drive shaft 8 in one direction at a speed proportional to the beat frequency. As the result of such rotation, casing 14 will rotate about an axis of precession 133, which axis extends through the trunnions 13. This precessional movement about axis 133 will tend to tension one of the springs 16 and compress the other, and at the same time will move shaft 20 angularly about axis 133 as a center. The angular movement of shaft 20 will be directly proportional to the difference in frequency of the voltages in buses 1 and 2. The direction of movement of shaft 20 from its normal position (as shown in the drawing), will be dependent upon the direction of rotation of drive shaft 8. As the gyroscope presses drive shaft 28, as the result of this angular movement about axis 133, it will effect a movement of the bearing member 21 therewith and as the result of the movement of the bearing member, arm 23 will rock about the pin 25 as a pivot and will effect an arcuate movement of the arcuate gear 24 which will cause a partial rotational movement of beveled gear 10 which enmeshes arcuate gear 24. It will thus be seen that while rotating contact member 9 makes one revolution per beat cycle, contact member 11 remains relatively stationary and is moved only slightly from its normal position by virtue of the precessional movement of the gyroscope. Furthermore, the angular movement of the relatively stationary contact member 11 is directly proportional to the amount of precession of the gyroscope which, in turn, is directly proportional to the frequency difference between the voltages in buses 1 and 2. It will thus be seen that as rotating contact member 9 approaches contact member 11, the two voltages approach phase equality. Contact of members 9 and 11 will, therefore, be made only when the two voltages are in phase. Of course, by widening contact member 11 paralleling may be obtained when the voltages are slightly out of phase by an amount corresponding to the width of contact member 11. Actual contact between contact members 9 and 11 will be made at a time which is prior to actual phase equality, by virtue of the change of the position of contact member 11 as the result of the precessional movement. In other words, as the result of the precessional movement, contact 11 will be moved in a direction so as to meet the approaching rotating contact member 9 sooner than it would otherwise. This advance angle of movement of contact 11 is directly proportional to the frequency difference of the voltages in buses 1 and 2.

It is well known that two alternating current systems should not be paralleled in the event that their frequency difference is too high, otherwise high circulating currents and severe mechanical shocks to the machines will ensue. In order to make it impossible for the paralleling relay to operate in the event that the frequency difference of the voltages of the two buses 1 and 2 is too great for safe paralleling, contact members 22 and 27 are provided which act in the following manner. As the result of precessional movement of the gyroscope, shaft 20 not only rotates but also moves angularly, carrying with it the square nut bearing member or contact member 22, sliding the latter along on arcuate contact member 27. As long as contact members 22 and 27 are in contact, the relay circuit remains uninterrupted. However, in response to an abnormal precessional movement of the gyroscope due to an abnormal frequency difference of the voltages, the slidable contact member 22 will be moved off of contact member 27 and on to a portion of the arcuate insulating member 28, thereby interrupting the paralleling relay circuit. Since contact members 22 and 27 and contact members 9 and 11 are in series in the relay circuit, it will be obvious that the actuating coil 6 for the main circuit breaker 5 cannot become energized unless both of these series connected contact members are closed.

I am, of course, aware that others, particularly after having had the benefit of the teachings of my invention, may devise other devices embodying my invention and I, therefore, do not wish to be limited to the specific showings made in the drawings and the descriptive disclosure hereinbefore made, but wish to be limited only by the scope of the appended claims and such prior art that may be pertinent.

I claim as my invention:

1. In combination with a pair of alternating current generating systems, switching means for effecting paralleling of said systems, said switching means including a gyroscope which gyroscope has a precessional torque which is proportional to the frequency difference of said systems, said switching means also including contact members which are closed as the result of said precession to effect paralleling of said systems at the precise instant of zero phase difference.

2. In combination with a pair of alternating current generating systems, switching means for effecting paralleling of said systems, said switching means including a motor which is energized by said systems so as to be driven at a speed corresponding to the frequency differences of said systems, a gyroscope driven by said motor, said gyroscope having a precessional movement which is proportional to the frequency difference of said systems, and means including contact members, having a time for actuation which is proportional to said frequency difference, for effecting paralleling of said systems.

3. In combination with a pair of alternating current generating systems, switching means for effecting paralleling of said systems, said switching means including a motor which is energized by said systems so as to be driven at a speed corresponding to the frequency difference of said systems, a gyroscope driven by said motor, said gyroscope having a precessional movement which is proportional to the frequency difference of said systems a main circuit breaker for paralleling said systems, and relay circuit means for actuating the same, contact members one of which is movable by the precession of said gyroscope and whose actuating time is proportional to said frequency difference for actuating said relay circuit means at a time sufficiently in advance so as to effect closing of said main circuit breaker at the moment of phase equality of said systems.

4. In combination with a pair of alternating current generating systems, switching means for effecting paralleling of said systems, said switching means including a motor which is energized by said systems so as to be driven at a speed corresponding to the frequency difference of said systems, a gyroscope driven by said motor, said gyroscope having a precessional movement which is proportional to the frequency difference of said systems, a main circuit breaker for paralleling said systems, and relay circuit means for actuating the same including a pair of contact members one of which is coupled to said motor shaft for rotation therewith and the other of which is movable by the precessional movement of said gyroscope for effecting closing of said contact members at a time in advance of phase and frequency equality of said systems which time interval is proportional to the speed of said motor so as to effect closing of said main circuit breaker at the movement of phase equality of said systems.

5. In combination with a pair of alternating current generating systems, switching means for effecting paralleling of said systems, said switching means including a motor which is energized by said systems so as to be driven at a speed corresponding to the frequency difference of said systems, a gyroscope driven by said motor, said gyroscope having a precessional movement which is proportional to the frequency difference of said system, a main circuit breaker for paralleling said systems, and relay circuit means for actuating the same including a pair of contact members one of which is coupled to said motor shaft for rotation therewith and the other of which is movable by the precessional movement of said gyroscope for effecting closing of said contact members at a time in advance of phase and frequency equality of said systems which time interval is proportional to the speed of said motor so as to effect closing of said main circuit breaker at the movement of phase equality of said systems, circuit interrupting means responsive to said precessional movement of said gyroscope for rendering said relay circuit means ineffective to cause actuation of said main breaker in the event of an abnormal frequency difference between said systems.

6. In combination with a pair of alternating current generating systems, switching means for effecting paralleling of said systems, said switching means including a motor which is energized by said systems so as to be driven at a speed corresponding to the frequency difference of said systems, a gyroscope driven by said motor, said gyroscope having a precessional movement which is proportional to the frequency difference of said systems, a main circuit breaker for paralleling said systems, and relay circuit means for actuating the same including a pair of contact members, one of which is coupled to said motor shaft for rotation therewith and the other of which is mounted on said gyroscope and is movable in accordance with the precessional movement thereof for effecting closing of said contact members at a time in advance of phase equality of said systems which time interval is proportional to the frequency difference of said systems so as to effect closing of said main circuit breaker at the moment of phase equality of said systems.

7. In combination with a pair of alternating current generating systems, switching means for effecting paralleling of said systems, said switching means including a motor which is energized by said systems so as to be driven at a speed corresponding to the frequency difference of said systems, a gyroscope driven by said motor, said gyroscope having a precessional movement which is proportional to the frequency difference of said systems, a main circuit breaker for paralleling said systems, and relay circuit means for actuating the same including a pair of contact members, one of which is coupled to said motor shaft for rotation therewith and the other of which is mounted on said gyroscope and is movable in accordance with the precessional movement thereof for effecting closing of said contact members at a time in advance of phase equality of said systems which time interval is proportional to the frequency difference of said systems so as to effect closing of said main circuit breaker at the moment of phase equality of said systems, a second pair of contact members, one of which is stationary and the other of which is mounted on said gyroscope and being adapted to move in accordance with the precession of said gyroscope, said second pair of contact members being in series with said first pair of contact members in said relay circuit means and being effective to interrupt said relay circuit means in the event of an abnormal frequency difference between said systems.

8. In combination with a pair of alternating current generating systems, switching means for effecting paralleling of said systems, said switching means including a gyroscope and a driving motor therefor which is driven at a speed corresponding to the frequency difference of said systems, said gyroscope including a gyro motor driven at constant speed, said gyroscope having a precessional movement which is directly proportional to the frequency difference of said systems, and means including two pairs of contact members, one contact member of each pair being movable by an amount corresponding to the precessional movement of the gyroscope as the result of a frequency difference in said system, spring means for normally biasing one of said pairs of contact members in a closed position, a tie circuit including a main circuit breaker and a relay circuit therefor including both pairs of contact members in series relationship, said precessional movement of the gyroscope being effective to close one of said pair of contact members at a time interval in advance of phase equality of said systems which is proportional to the frequency difference of said systems, the other of said pair being operable as the result of abnormal frequency difference between said systems, thereby energizing said relay circuit at a sufficiently early time so that said main circuit breaker will close when said systems have acquired phase equality and effect closing of said tie circuit and paralleling of said systems.

9. A paralleling system for connecting in parallel two alternating current systems including a gyroscope for closing a paralleling relay circuit at an advance time interval which is in proportion to the frequency difference of the two systems.

PHILLIPS THOMAS.